Patented Nov. 28, 1922.

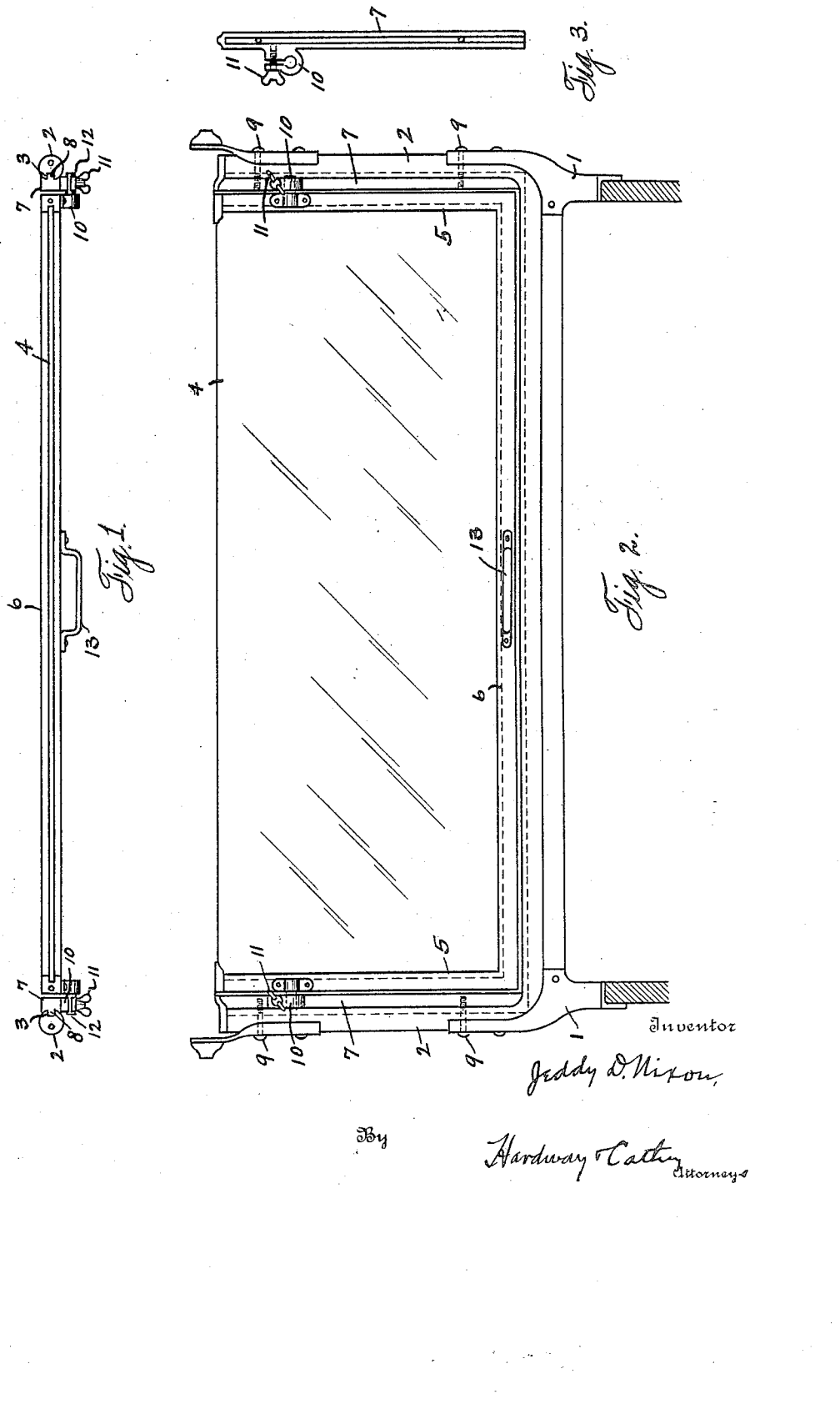

1,436,816

UNITED STATES PATENT OFFICE.

JEDDY D. NIXON, OF HOUSTON, TEXAS.

WINDSHIELD.

Application filed April 18, 1922. Serial No. 555,119.

*To all whom it may concern:*

Be it known that I, JEDDY D. NIXON, citizen of the United States, residing at Houston, in the county of Harris and State of Texas, have invented certain new and useful Improvements in a Windshield, of which the following is a specification.

This invention relates to new and useful improvements in a windshield.

One object of the invention is to provide a construction of the character described which has been especially adapted for use on Ford automobiles. As is well known the lower section of the windshield of a Ford automobile is stationary. It is the object of this invention to provide a lower section for a windshield of a Ford automobile which is adjustable.

Another object of the invention is to provide a shield of the character described which may be readily substituted for the stationary shield now in use on said automobile, at small expense and with little labor.

With the above and other objects in view the invention has particular relation to certain novel features of construction, arrangement of parts, and use, an example of which is given in this specification and illustrated in the accompanying drawings, wherein:—

Figure 1 is a plan view of the lower section of the windshield.

Figure 2 is a front elevation and,

Figure 3 is a detailed view of one of the end bars employed.

In the drawings the numerals 1, 1 designate the supporting brackets which are secured to the front end of the vehicle body to support the windshield, and the numerals 2, 2 designate the end members of the supporting frame. These end members have the vertical grooves 3, 3 in their inner side and, as the lower section of the Ford windshield is now constructed, these grooves receive the ends of the glass pane, which is held stationary thereby. It is contemplated that the present stationary section be removed from the end members 2, 2 and one end of it cut off forming the glass section 4 which is fastened in a suitable frame composed of the end members 5, 5 and the bottom frame member 6. The numerals 7, 7 designate end bars whose outer sides have the lengthwise ribs 8, 8 which are fitted into the grooves 3, 3 and these end bars are secured in place by means of bolts 9. Each of the end bars 7 is formed with a bearing 10 which is adjustable through the instrumentality of the thumb screw 11, as illustrated in Figure 3, and the end members 5 of the frame carry stub shafts as 12, which work in said bearings. The lower frame member 6 carries a grip 13 by means of which the lower section of the windshield may be adjusted to any suitable angle turning on the shafts 12 and said section may be held at any point of adjustment by tightening up the thumb screws 11.

What I claim is:—

1. In combination a supporting frame work formed with end members, supporting bars fastened to the inner side of said end members and formed with bearings, a frame having a stub shaft at each end, said shafts working in said bearings, and a transparent pane in said frame.

2. In combination a frame work formed with end members, the inner side of each end member having a vertical groove, end bars each formed with a lengthwise rib, said ribs fitting in the respective grooves, means for securing said bars to said end members, a bearing carried by each end bar, a frame, a stub shaft carried by each end of said frame and working in said bearings, and a transparent pane in said frame.

3. In combination a frame work formed with end members, the inner side of each end member having a vertical groove, end bars each formed with a lengthwise rib, said ribs fitting in the respective grooves, means for securing said bars to said end members, a bearing carried by each end bar, a frame, a stub shaft carried by each end of said frame and working in said bearings, means for adjusting the said bearings, and a transparent pane in said frame.

In testimony whereof I have signed my name to this specification in the presence of two subscribing witnesses.

JEDDY D. NIXON.

Witnesses:
W. H. DUNLAY,
E. V. HARDWAY.